March 10, 1959  J. D. EISLER ET AL  2,877,080
VARIABLE-INTENSITY RECORDER
Filed July 2, 1956  4 Sheets-Sheet 1

INVENTORS:
JOSEPH D. EISLER
CHARLES F. HADLEY
BY DANIEL SILVERMAN

Newell Pottoff
ATTORNEY

March 10, 1959　　J. D. EISLER ET AL　　2,877,080
VARIABLE-INTENSITY RECORDER

Filed July 2, 1956　　　　　　　　　　　　　4 Sheets-Sheet 3

INVENTORS:
JOSEPH D. EISLER
CHARLES F. HADLEY
DANIEL SILVERMAN
BY
ATTORNEY

March 10, 1959 J. D. EISLER ET AL 2,877,080
VARIABLE-INTENSITY RECORDER
Filed July 2, 1956 4 Sheets-Sheet 4

INVENTORS:
JOSEPH D. EISLER
CHARLES F. HADLEY
DANIEL SILVERMAN
BY
Newell Pottorf
ATTORNEY United States Patent Office
2,877,080
Patented Mar. 10, 1959

2,877,080

VARIABLE-INTENSITY RECORDER

Joseph D. Eisler, Charles F. Hadley, and Daniel Silverman, Tulsa, Okla., assignors to Pan American Petroleum Corporation, a corporation of Delaware Application July 2, 1956, Serial No. 595,181

8 Claims. (Cl. 346—74)

This invention relates to multiple-trace recorders and is directed particularly to a multiple-trace recording system using an electrosensitive recording medium. More specifically, it is directed to reproducing seismic data in the form of parallel, variable-intensity traces on a non-photographic recording medium. While it will be described with reference to the recording of seismic data, it is not necessarily limited thereto but, as will be obvious, can be adapted for recording of mechanical vibration and many other types of data.

In seismic data recording, by far the most commonly used system has been a photographic one wherein visible oscillographic traces are recorded on a photosensitive paper or film. In many respects this type of recording is completely satisfactory in spite of some obvious drawbacks. The photosensitive recording material is relatively more expensive than other types and requires both time and expense for the necessary chemical processing to render the data visible. When the traces of a multiple-trace system are placed close together to increase the number which may be recorded on a given width of record material, the traces tend to overlap making interpretation difficult. Also, for certain purposes it may be desirable to shift some of the traces lengthwise relative to others to improve the alignment of certain events from trace to trace and record to record. Such shifting is difficult to achieve with conventional seismic recording on photographic media. Even when the shifting can be accomplished, as in the preparation of so-called record cross-sections, the significant trends are not always entirely obvious from the oscillographic traces.

With the increasing use of magnetic-tape systems of seismic field data recording, the possible variations in recording conditions during playback are greatly increased. Relative time shifting of different traces is readily accomplished to eliminate the effects of variable weathering thickness along the seismic detector spread, variations in shot or detector elevation, and the like. In addition, it becomes possible to vary the relative time shifting of traces during playback to eliminate the so-called normal move-out, which is the increase in reflection travel time due to a receiver being horizontally offset from the shot point. Also, the conversion from a time to a depth scale of recording in accordance with a measured or an assumed velocity-depth function becomes feasible.

Even with such versatility as is provided by magnetic recording systems there remains, however, the problem of how to make the final visible-trace recording in a manner best suited for the final interpretation and presentation of the seismic data. Where it is desired to present a great many parallel traces in a narrow space, it is obvious that varying the intensity of recording of each trace along its length has a number of advantages. Variable-intensity recording is most often accomplished using photographic media, in spite of their relatively greater cost and time of processing.

It is accordingly a primary object of our invention to provide a recording system for producing multiple-trace, variable-intensity recordings on a non-photographic record medium. Other and further objects may be briefly enumerated as: (1) to record seismic data either directly or as playback from a magnetic field recording as variable-intensity traces on a non-photographic electrosensitive record medium; and (2) to provide for both fixed and variable shifting of the traces relative to each other during recording, both to compensate for the misalignment of significant events and, if desired, to convert from a time to a depth scale. Other and further objects, uses, and advantages of the invention will become apparent as the description proceeds.

Briefly stated, the foregoing and other objects are accomplished by a system wherein a plurality of recording styli are adapted to make contact with a lengthwise-moving strip of electrosensitive recording medium, and varying electric voltages are applied to the styli to produce variations in the intensity of marking of the recording medium. According to some embodiments of the invention the styli may be mounted on the periphery of a rapidly rotating disk, with the surface of the recording medium being curved so that the styli maintain contact with the surface of the recording medium as they are transported across it by the rotation of the disk. Switching means, preferably electronic in nature, connect each stylus in turn to the appropriate source of recording voltage as the stylus sweeps across the portion of the record surface allotted for recording a given trace. Where more than one stylus contacts the recording surface simultaneously, multiplexing means are provided between the styli and various signal sources such that each source is recorded at its proper trace position on the record medium.

According to other embodiments of the invention, the recording styli are so mounted as to be movable in the direction of extension of the record traces and means are provided for adjusting or continuously shifting the relative positions of the various styli lengthwise of the trace before or during the making of a record. Preferably, in addition, a widening of each trace is accomplished to improve its readability, by introducing a rapid lateral movement or oscillation of each stylus in contact with the face of the moving record medium.

The invention will be more easily understood by reference to the accompanying drawings forming a part of this application and showing a number of embodiments and modifications of the invention. In these drawings, Figure 1 is a view, which is partially diagrammatic and partially in perspective, of the circuits and apparatus for producing a four-trace variable-density record;

Figure 1:
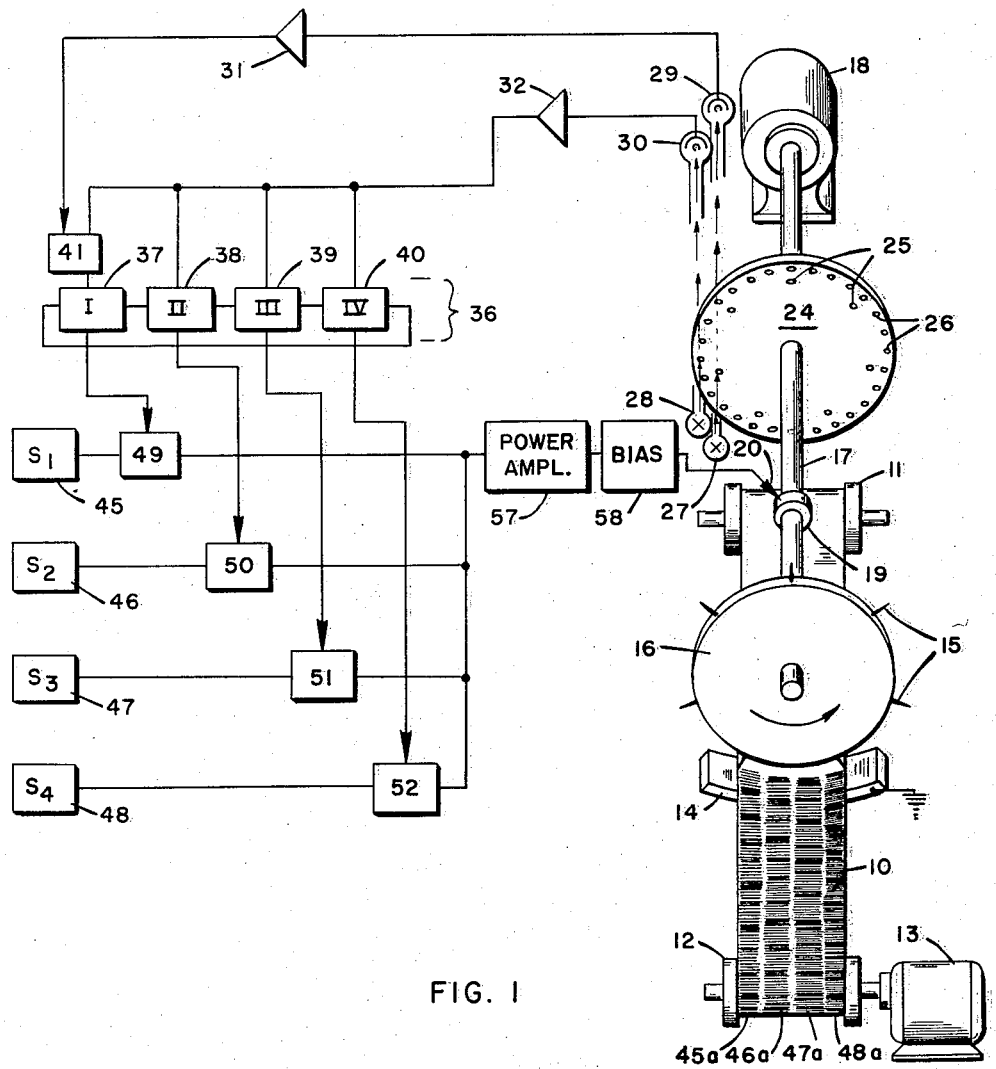

Referring now to these drawings in detail, Figure 1 illustrates an embodiment of the invention for simultaneously recording four variable-intensity signal traces. The showing of a four-trace recorder is for ease of explanation only, as it will be obvious how any greater or lesser number of traces can be recorded in this manner. In Figure 1, a record-receiving medium 10 is drawn from a supply spool 11 to a takeup spool 12 which is turned at an appropriate speed by a motor 13. This speed, for example, may be approximately that employed in making photographic seismograph field records. The recording medium 10 is preferably of an electrosensitive paper type, such as that known by the trademark "Teledeltos." The spools 11 and 12 are spaced somewhat apart, and between them the record-medium strip 10 passes over a curved, metallic backing plate 14 adapted to curve the surface of the record strip 10 so that it can be contacted by the tips of a plurality of styli 15 projecting radially from the edge of a disk 16. The disk 16 is mounted on a shaft 17 rotated by a motor 18, electrical connections to the styli of disk 16 being established and maintained by a slip ring 19 on shaft 17 contacted by a brush 20.

Also mounted on shaft 17 so as to be rotated synchronously with disk 16 is a synchronizing disk 24 containing two circular rows of apertures 25 and 26. The angular spacing of the apertures 25 corresponds to the angular separation of the styli 15 on the periphery of disk 16, while the angular separation of apertures 26 is equal to the angular width of each variable-density trace or, in other words, the angular distance traveled by each stylus tip 15 while recording each individual trace.

Located so as to transmit and receive light through the apertures 25 are a light source 27 and a photocell 29, while a second light source 28 and a photocell 30 are respectively positioned to transmit and receive light through the apertures 26. The output of the photocell 29 is amplified by an amplifier 31, while that of the photocell 30 is amplified by an amplifier 32.

The impulses from the photocell amplifier 32 are applied to the four stages of a ring counter 36, respectively designated 37, 38, 39, and 40. As ring counters are well-known in the art, the counter 36 will not be described in detail, other than to point out that, in operation, one of the four stages is "on" while all of the others are "off." Receipt of each triggering impulse from the photocell amplifier 32 turns the "on" stage "off" and turns "on" the following stage in the ring, which stage remains "on" until receipt of the next triggering pulse. During the time interval when a counter stage is "on," voltage appears on its output lead and may be used for gating or other purposes. A description of a ring-counter circuit suitable for use in this invention appears at pages 150–153 of Electronics, April, 1946.

Impulses from both photocell amplifiers 31 and 32 are applied to a coincidence or gating amplifier 41 which feeds the first stage 37 of counter 36, the purpose of the gating amplifier 41 being to insure that the operation of counter 36 starts with stage 37 when the stylus 15 is at the edge of the record strip 10 beginning its sweep across the strip. The four signals to be recorded as four variable-density traces are provided by the respective signal sources 45, 46, 47, and 48, which may represent the outputs of individual seismometers or seismometer groups, amplified as necessary, or the outputs of magnetic reproducing channels reproducing such signals from a magnetic tape. Regardless of the nature of these signals as original or reproduced voltages, they are respectively applied to coincidence or gating amplifiers 49, 50, 51, and 52. Simultaneously, the respective gating amplifiers are supplied with voltages from the respective counter stages 37, 38, 39, and 40. The outputs of the gating amplifiers are connected together and to a power amplifier 57, in series with a source of recording-bias voltage 58, the resultant output voltage of amplifier 57 and voltage source 58 being applied to the brush 20 and thence to the recording styli 15.

It is the function of each of the gating or coincidence amplifiers 49, 50, 51, and 52, to transmit to its output circuit signal voltages only when both the signal voltage from the appropriate source 45, 46, 47, or 48, and the gating voltage from one of the stages of ring counter 36 is applied to it. When either voltage is present alone at the gating amplifier input, no output signal is produced. Many circuits for doing this are well-known in the art, some being described in chapter 10 of Waveforms, page 378, by Chance et al., published as volume 19 of the Radiation Laboratory Series by McGraw-Hill Book Company, Inc.

The operation of this embodiment of the invention may be understood from the foregoing description and the following explanation. Considering one cycle of operation of the ring counter 36, pulses from the photocell amplifiers 31 and 32 are simultaneously transmitted through the coincidence amplifier 41 to actuate counter stage 37 at the instant the stylus 15 is on the edge of the record medium 10 in the position shown in Figure 1. Signals are simultaneously present at the outputs of all of sources 45, 46, 47, and 48. However, gating voltage is present only on the output of counter stage 37 so that, during the time interval designated I, only the signal from source 45 will be passed through the gating amplifier 49 to the power amplifier 57 and thence to the stylus 15. At this time the absence of gating voltage from counter stages 38, 39, and 40, prevents gating amplifiers 50, 51, and 52, from transmitting signals of any of sources 46, 47, and 48 to the power amplifier 57. Accordingly, the stylus 15 draws a short line to form the variable density trace 45a, the intensity of this line being proportional to the instantaneous amplitude of the signal received from source 45.

It will be understood that the voltage supplied by bias voltage source 58 is normally of about the proper magnitude to produce an intermediate density of marking of the record medium 10, taking into account the rate of travel of the stylus 15 across the medium. The amplification of the power amplifier 57 is arranged to superimpose on the bias voltage of unit 58 an alternating voltage of such magnitude that the intensity of marking on record 10 varies from just faintly visible for a maximum signal of one polarity to a maximum blackening for a maximum signal of the opposite polarity. For most purposes it is satisfactory to assume that the density of marking is approximately linear within the range of the upper and lower voltage limits.

As an example of the magnitude of marking voltages involved, it may be noted that in one model of this embodiment of our invention wherein the stylus speed was about 1400 inches per second across the face of the recording medium 10, the voltages for minimum and maximum marking were about 200 volts and 600 volts respectively. Such a marking voltage is provided by a constant bias voltage of 400 volts, on which is superimposed a varying or alternating voltage of 400 volts peak-to-peak amplitude. If more accurate proportionality between the amount of blackening and the applied voltage in this range is desired, it can be provided in any of several ways, such as, for example, by varying the bias voltage or superimposing a compensating voltage on those already present.

To continue the description of the operation of this embodiment of the invention, during interval II, when stage 38 of counter 36 is acting on gating amplifier 50, only the signal from source 46 is transmitted to amplifier 57 and stylus 15 for recording. Similarly, during interval III the signal from source 47 is transmitted through gating amplifier 51, and during interval IV the signal from source 48 is transmitted through gating amplifier 52. This completes the sweep of one of styli 15 across the face of record medium 10, and the cycle of counter 36 is repeated beginning again with stage 37.

For recording seismic signals as received during field recording, it will be understood that the successive passes of styli 15 across the face of record medium 10 should take place in quite rapid sequence. Thus, it is preferred that the time interval between the successive dots or marks forming each variable-density trace be not greater than one millisecond long, and preferably it should be of the order of one-half millisecond length. It can, of course, be much shorter than this, as it is no disadvantage to have the time interval between dots as short as possible. This means that the required speed of rotation of the disk 16 may be quite high.

Figure 2:
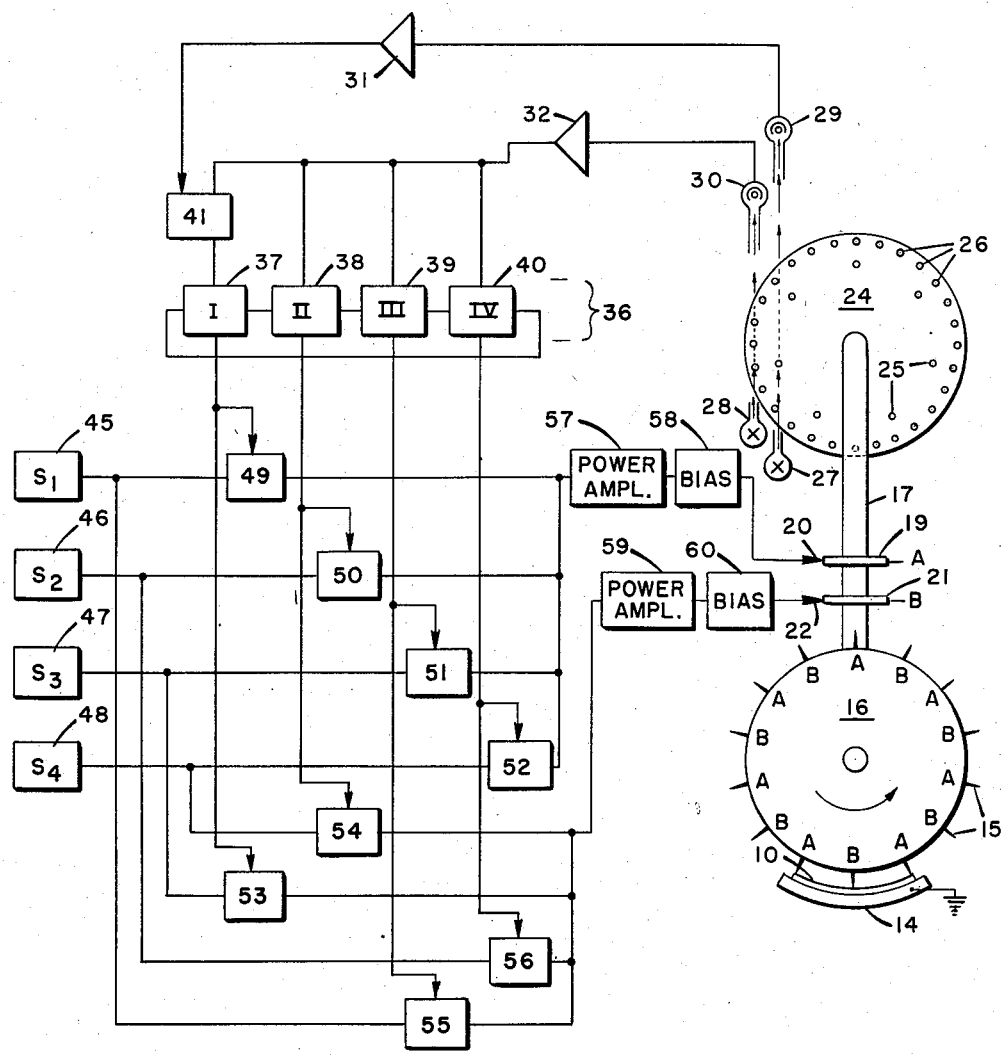
Figure 2 is a view similar to Figure 1 of a modification of the apparatus of Figure 1 including a multiplexing feature.

In Figure 2 is shown a modification of the invention of Figure 1 wherein the necessary speed of rotation of the disk 16 is substantially reduced. In most respects the embodiment of Figure 2 is the same as Figure 1. However, on disk 16 the spacing of the styli 15 is only half of that in Figure 1, so that there are always two styli in position for recording on the record medium 10. These styli have been identified on the drawing by the capital letters A and B respectively. There is provided on the shaft 17 an additional slip ring 21 contacted by a brush 22 to which all of the B styli are electrically connected. Likewise, all of the A styli are connected to the slip ring 19 similarly designated A.

This embodiment of the invention requires an additional set of four gating or coincidence amplifiers 53, 54, 55, and 56, all connected together at their output terminals and to a second power amplifier 59, in series with a second bias-voltage source 60 connected to the brush 22. The output leads of counter stages 37, 38, 39, and 40, are respectively connected to the gating amplifiers 53, 54, 55, and 56, in that order, in addition to having the same connections as in Figure 1 to the gating amplifiers 49, 50, 51, and 52. The signal source 45 is connected to both of gating amplifiers 49 and 55. Source 46 is connected to both of gating amplifiers 50 and 56, source 47 to gating amplifiers 51 and 53, and source 48 to gating amplifiers 52 and 54.

Considering the operation of this modification of the invention of Figure 1, during time interval I when gating voltage is supplied from counter stage 37, the signal from source 45 is supplied through gate 49 to stylus A, while simultaneously the signal from source 47 is connected through gate 53 to stylus B. Thus, the traces 45a and 47a of Figure 1 are recorded simultaneously. During the next interval II of counter operation, gates 50 and 54 are actuated by stage 38 to transmit signals from source 46 to stylus A and from source 48 to stylus B. Thus, the traces 46a and 48a are simultaneously recorded. During interval III of counter operation, gates 51 and 55 are open, so that the signal from source 45 goes to stylus B, while that from source 47 goes to stylus A. In the final interval IV of counter operation, gates 52 and 56 connect signal source 48 to stylus A and signal source 46 to stylus B. This completes one cycle of counter operation, and the whole process is then repeated.

It will be apparent that this embodiment permits the speed of disk 16 to be one-half of that required for operation according to Figure 1 for a given separation in time between successive passes of the stylus 15 across the recording strip 10. Thus, the arrangement of gating amplifiers 49 to 56 in Figure 2 constitutes not only a switching matrix but a multiplexing system which connects each stylus in turn to the one signal source to be recorded in one allotted trace space on record strip 10, as each stylus in succession reaches the edge of that trace space. In view of this explanation, it is believed obvious that by using an even closer spacing of the styli 15, together with additional gating amplifiers, power amplifiers, and bias sources, further reduction in the speed of disk 16 or, alternatively, closer spacing of successive lines forming the variable-density traces is possible.

Figure 3:
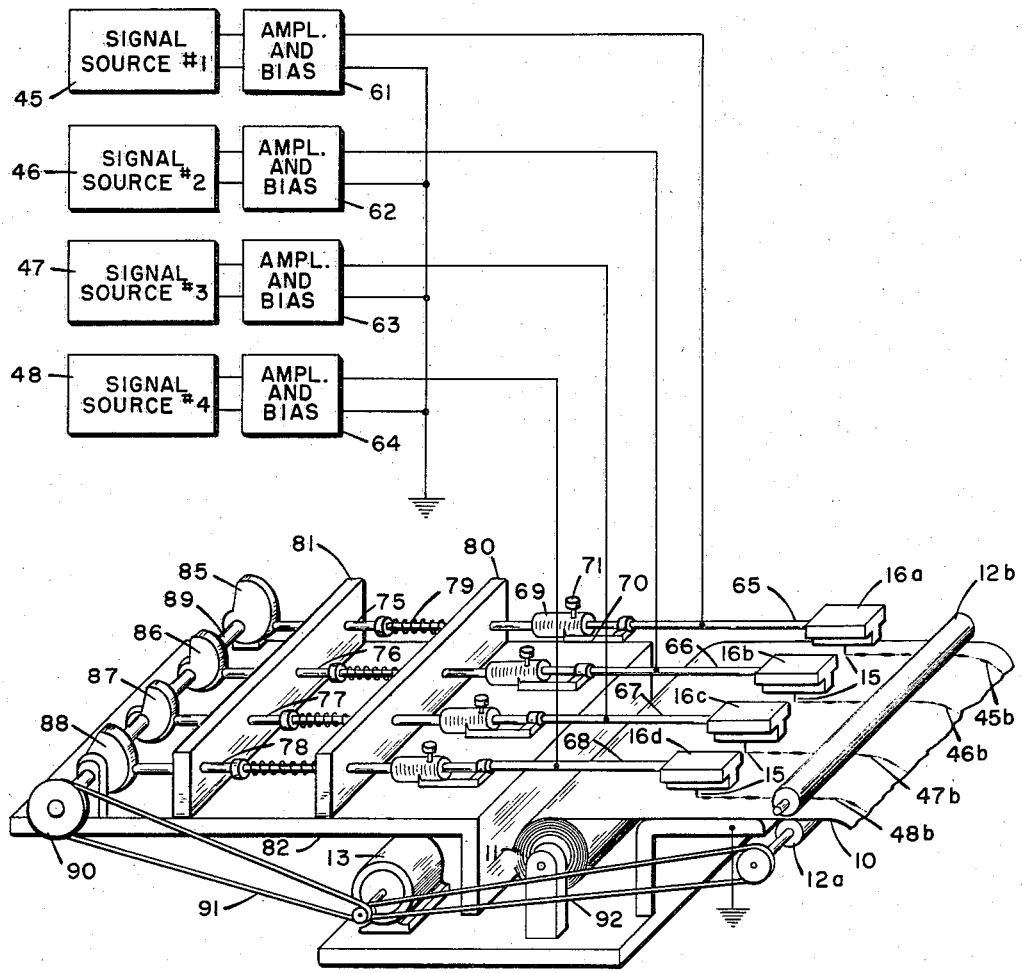
Figure 3 is a view, partially diagrammatic and partially in perspective, of an alternative embodiment of the invention providing for relative shifting of the recording styli.

In Figure 3 is shown an alternative embodiment of a variable-intensity multiple-trace recording system which provides both for fixed and variable lengthwise adjustment of the positions of the various recording styli during the making of a record. Thus, in this embodiment each recording stylus 15, instead of projecting from the edge of a disk 16, is set in a mounting block 16a attached to the end of a rod 65 which parallels the direction of extension of the record trace 45b. In a four-trace recorder there are four of such styli 15 mounted on four rods 65, 66, 67, and 68. These rods are respectively attached to the ends of four parallel rods 75, 76, 77, and 78, which are capable of lengthwise movement through a pair of supporting guide members 80 and 81 set on a base 82. The combined length of the rods 65 and 75 is adjustable by a sleeve 69 attached to the end of the rod 75 in which the end of the rod 65 is slidable and adapted to be secured by a set screw 71. Positioning of the end of rod 65 in sleeve 69 is normally done by reference to index member 70 on the rod 65 which cooperates with a scale marked on the sleeve 69. Similar length adjustments are provided for the rods 66, 67, and 68, so that, by appropriate adjustments, different relative fixed corrections may be applied to the different recording styli in accordance with the variations of elevation, weathering, and the like along a seismic detector spread. A compression spring 79 normally biases each of the rod members, such as 75, toward the left in the figure.

The ends of the rods 75, 76, 77, and 78, respectively bear against the surfaces of a plurality of cams 85, 86, 87, and 88, mounted on a shaft 89 rotated by a wheel or gear 90, adapted to be driven by a connection, such as a belt 91, from the record-medium drive motor 13. By a similar connection 92 the record medium 10 is drawn past the styli 15 between a pair of rollers 12a and 12b, at least one of which is driven by the motor 13 through the drive 92.

An electrical connection extends respectively from each of the signal sources 45, 46, 47, and 48, each provided with a separate power amplifier and bias unit 61—64, to the rods 65, 66, 67, and 68, and thence to each corresponding one of the syli 15.

In operation, therefore, the varying marking current applied to each of the styli 15 from the corresponding signal source 45—48, as modified by one of the bias and amplifying units 61—64, produces one of the variable-intensity traces 45b—48b. These are generally similar to traces 45a—48a of Figure 1, except that they are single lines rather than bands of substantial width. Since the speed of relative movement between the tip of stylus 15 and the surface of record strip 10 is much lower than in the case of Figures 1, 2, being substantially only the rate of movement of the strip lengthwise by the rollers 12a and 12b, substantially lower marking voltages may be applied to the styli 15 to produce the variable marking intensity. In general, however, the character of the voltages supplied by the units 61—64 respectively through the rods 65—68 to the styli 15 is the same as in the previous embodiments. By proper shaping of the cams 85—88, it will be apparent that corrections can be made for normal move-out during the course of making each record. In addition, if desired, the longitudinal scale units along the record can be converted from time to depth in accordance with a velocity-depth function. As the manner of shaping the cams 85—88 to provide these various corrections or scale changes is well-known in the art and forms no part of the present invention, further description of this point is not deemed necessary.

Figure 4:
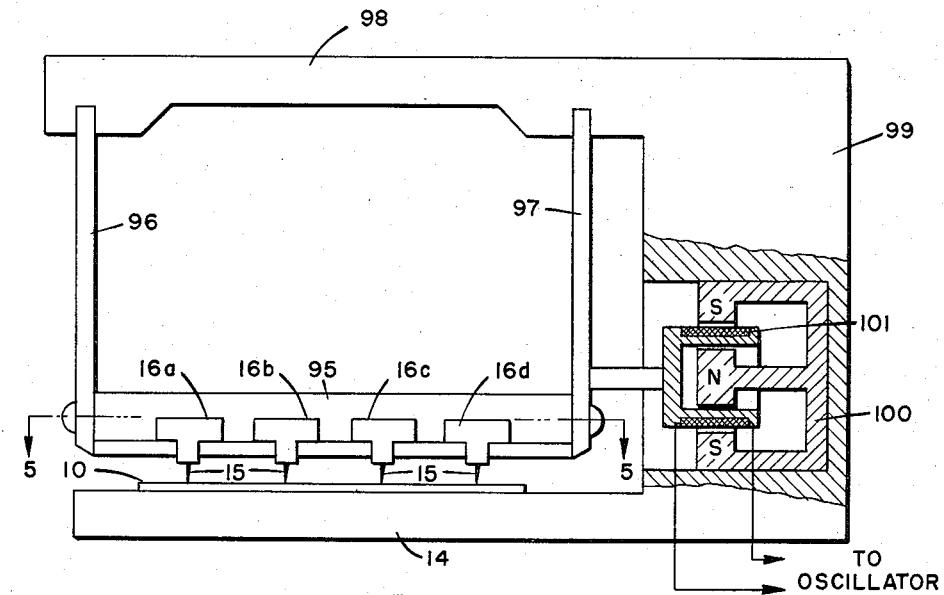
Figure 4 is an elevation view partially in cross-section, of means applicable to the embodiment of Figure 3 for producing widening of the recorded traces; and, Figure 5 is a cross-section of the device of Figure 4 along the lines 5—5.
Figure 5:
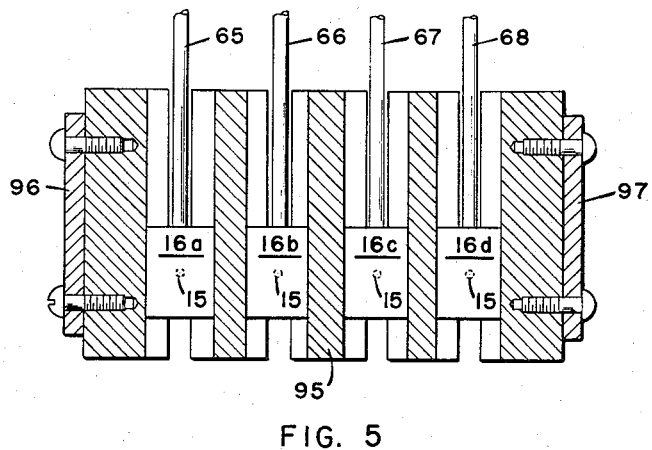

While the narrow-line traces 45b—48b of Figure 3 may contain all of the information to be recorded, for the purpose of more easily interpreting this information or for purposes of display of the data, it is preferred that these lines be widened in some way to approximate more closely the bands 45a—48a shown in Figure 1. Figures 4 and 5 show one mechanism for accomplishing this object. Thus, the mounting blocks 16a—16d carrying the four styli 15 are carried in longitudinal grooves or tracks in a block 95 which is held parallel to the face of record medium 10. This block 95 is vibrated at a high frequency from side-to-side to impart a corresponding oscillatory motion to the tips of the styli 15 as they record the traces 45b—48b. By making this oscillation of sufficiently high frequency, relative to the frequencies being recorded, the lines so drawn more closely approximate bands of finite width such as the bands 45a—48a of Figure 1.

Thus, the block 95 is suspended over the surface of record material 10 by a pair of vertical spring members 96 and 97 attached to the ends of the block 95 and secured at their other ends to an overhead beam 98 supported on a solid post 99. An oscillatory force is imparted to the block 95, so suspended, by a coil and magnet assembly mounted in the post 99, the coil 101 being attached to the block 95 or the lower end of the spring member 97 and being located in the annular gap of a permanent magnet 100 set in a recess in the post 99. By applying alternating current of a proper frequency from an oscillator of conventional type, not shown, to the coil 101, an oscillatory force creates vibration of the block 95, and correspondingly of the mounting members 16a—16d and styli 15, transverse to the direction of motion of the recording medium 10 and parallel to its surface.

As is shown more clearly in Figure 5, this transverse vibration of the styli 15 and mounting blocks 16a—16d does not interfere with their longitudinal adjustment by the cam members 85—88, since these mounting blocks 16a—16d are adapted to slide freely in the channels within the block 95. By making the oscillator frequency substantially equal to the resonant frequency of the mechanical system consisting of the block 95 and the springs 96 and 97, an oscillation of substantial magnitude can be produced with reasonable amounts of power input.

It will be understood that the showing of Figures 3, 4, and 5, is highly diagrammatic, and that in an actual mechanical design of this embodiment the styli 15 may be relatively much closer together and the mounting blocks 16a—16d relatively much smaller than they are shown in these figures. Thus, the resultant traces may have substantial width and yet be fairly closely spaced, so that an effective presentation of the seismic data, corrected as desired for move-out and other effects, will be the result.

While the embodiments of Figures 1, 2, and 4, have accomplished the function of trace widening by transverse motion of the styli 15 while the record strip 10 moves lengthwise, it will be obvious that only the relative transverse motion of the styli and strip 10 is important. Thus, it would be apparent that the strip 10 could be vibrated transversely while being pulled lengthwise past the stationary or shiftable styli 15 of Figure 4.

While we have thus described our invention in terms of the foregoing specific embodiments and details, it is to be understood that the invention is not necessarily limited to these details, but a great many further modifications and possible arrangements wil be apparent to those skilled in the art. The scope of the invention therefore should not be considered as limited to the details described but is properly to be ascertained from the scope of the appended claims.

We claim:

1. A multiple-trace recording system for producing on an electrosensitive record medium a plurality of variable-intensity traces each corresponding to the signal received from one of a plurality of signal sources, said system comprising, in combination, a plurality of styli at least one of which is always in contact with said record medium, means for moving said medium past said styli in the direction of extension of said traces, a source of continuous marking voltage of a magnitude adapted to produce an intermediate density of marking of said medium by said styli, means for producing a voltage varying with the instantaneous amplitude of each of said signals to be recorded, and means for applying to said at least one of said styli a resultant voltage which is a combination of said marking voltage and said varying voltage, the variations of said varying voltage being of a magnitude to vary the density of marking of a trace on said record medium by said resultant voltage over a substantial range above and below said intermediate density depending on the polarity and instantaneous amplitude of the corresponding signal.

2. A system as in claim 1 including means for producing, between said medium and the tip of said one of said styli, a relative movement parallel to the face of said medium and perpendicular to said direction of trace extension, whereby the trace produced by said one of said styli is substantially wider than the effective area of contact between said stylus tip and said medium.

3. A system as in claim 1 wherein the number of said styli is equal to the number of said signal sources, all of said styli being simultaneously in contact with said medium, and there being a separate source of resultant voltage connected between each of said signal sources and the corresponding one of said styli.

4. A system as in claim 1 wherein said styli are mounted on the edge of a rotatable disk, and including means for rotating said disk and for curving said record medium so that the tip of each of said styli can maintain contact with the surface of said medium substantially throughout its width, and a multiplexing switch means for connecting said one of said styli to receive mark-producing resultant voltages from different ones of said signal voltage sources in succession during each passage of said one of said styli across said record medium.

5. A system as in claim 4 wherein a plurality of said styli are simultaneously in contact with said record medium, and said multiplexing switch means is adapted to establish an electrical connection simultaneously between all of said contacting styli and each of an equal number of said signal sources.

6. A system as in claim 3 including means to oscillate all of said styli simultaneously parallel to the face of said medium and perpendicular to said direction of trace extension to widen all of said traces, the frequency of said oscillation being high compared to the frequencies of the signals to be recorded.

7. A system as in claim 3 including means for shifting at least some of said styli in said trace-extension direction relative to others of said styli during the making of a multiple-trace recording.

8. A recording system for producing on an electrosensitive record medium a variable-intensity trace corresponding to the signal received from a signal source, said system comprising, in combination, at least one stylus in contact with said record medium, means for moving said medium past said stylus in the direction of extension of said trace, means for producing between said medium and the tip of said stylus a substantially uniform relative movement parallel to the face of said medium and perpendicular to said direction of trace extension, a source of continuous marking voltage of a magnitude adapted to produce an intermediate density of marking of said medium by said stylus, means for producing a voltage varying with the instantaneous amplitude of the signal received from said signal source, and means for applying to said stylus a resultant voltage which is a combination of said marking voltage and said varying voltage, the variations of said varying voltage being of a magnitude to vary the density of marking of said trace on said record medium by said resultant voltage over a substantial range above and below said intermediate density depending on the polarity and instantaneous amplitude of said signal.

References Cited in the file of this patent

UNITED STATES PATENTS

| 2,539,553 | Rich | Jan. 30, 1951 |
| 2,664,509 | Trevor | Dec. 29, 1953 |
| 2,680,151 | Boothroyd | June 1, 1954 |
| 2,682,575 | Edson | June 6, 1954 |
| 2,708,615 | Greenleaf et al. | May 17, 1955 |
| 2,739,865 | Willey | Mar. 27, 1956 |
| 2,775,503 | Peterson | Dec. 25, 1956 |
| 2,789,027 | Miller et al. | Apr. 16, 1957 |

FOREIGN PATENTS

| 688,235 | Great Britain | Mar. 4, 1953 |
| 710,411 | Great Britain | June 9, 1954 |